Figure 1:
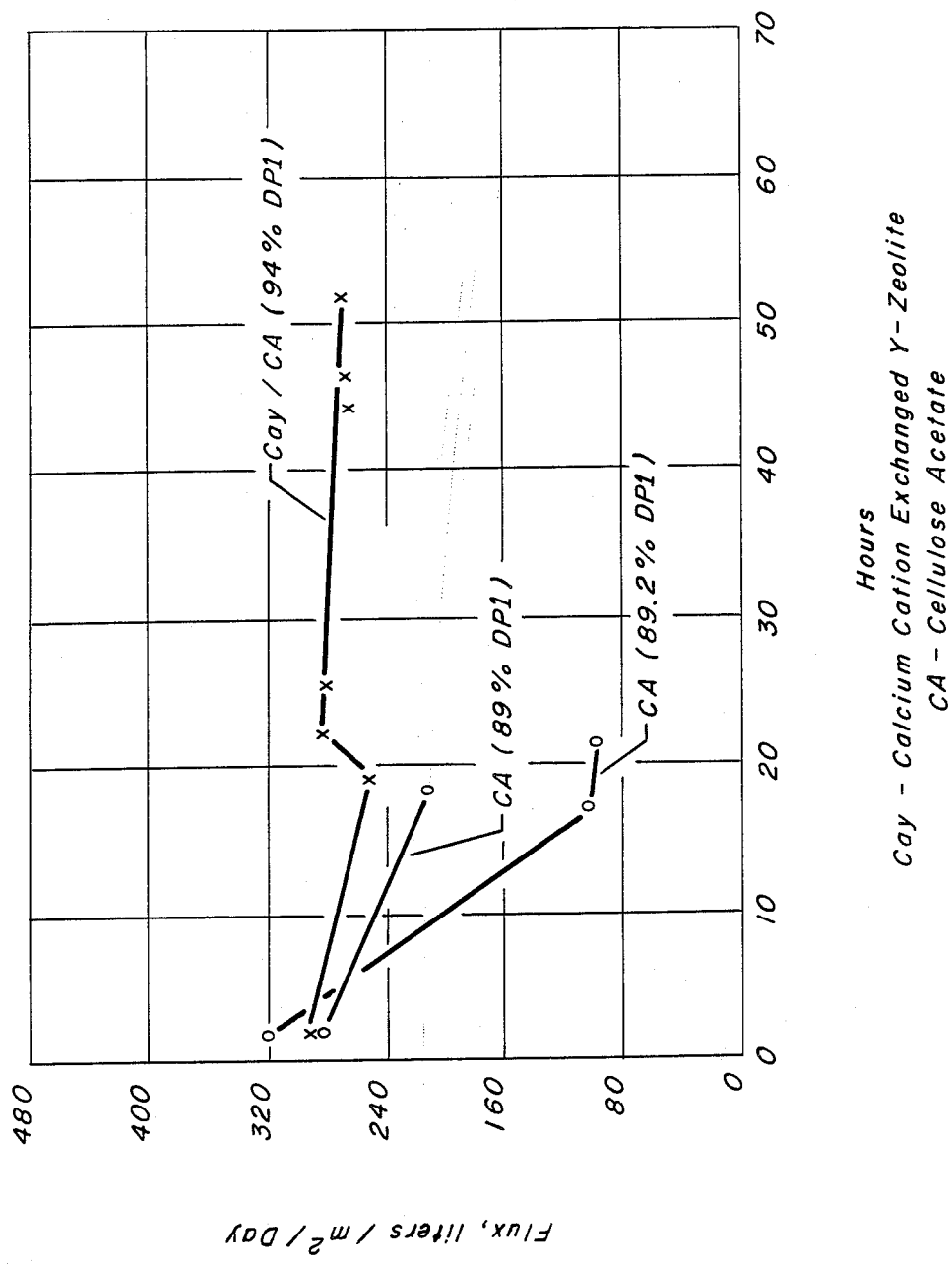

United States Patent [19]

Kulprathipanja et al.

[11] Patent Number: 4,735,193

[45] Date of Patent: Apr. 5, 1988

[54] SEPARATION OF A MONOSACCHARIDE WITH MIXED MATRIX MEMBRANES

[75] Inventors: Santi Kulprathipanja, Hoffman Estates; Edward W. Funk, Highland Park; Sudhir S. Kulkarni, Hoffman Estates; Y. Alice Chang, Des Plaines, all of Ill.

[73] Assignee: UOP Inc., Des Plaines, Ill.

[21] Appl. No.: 699,897

[22] Filed: Feb. 8, 1985

[51] Int. Cl.⁴ .............................................. B01D 13/00
[52] U.S. Cl. ...................... 127/46.3; 127/55; 210/638; 210/651; 210/654; 210/655
[58] Field of Search ............... 127/10, 46.3, 54, 55; 210/638, 651–655, 669, 680, 692, 694

[56] References Cited

U.S. PATENT DOCUMENTS

| | | | |
|---|---|---|---|
| 2,924,630 | 2/1960 | Fleck et al. | 260/676 |
| 2,985,589 | 5/1961 | Broughton et al. | 210/34 |
| 3,133,132 | 5/1964 | Loeb et al. | 264/49 |
| 3,133,137 | 5/1964 | Loeb et al. | 264/233 |
| 3,246,767 | 4/1966 | Pall et al. | 55/521 X |
| 3,457,170 | 7/1969 | Havens | 210/23 |
| 3,556,305 | 1/1971 | Shorr | 210/490 |
| 3,817,232 | 6/1974 | Nakajima et al. | 123/119 A |
| 3,862,030 | 1/1975 | Goldberg | 210/24 |
| 3,878,104 | 4/1975 | Guerrero | 210/323 |
| 3,993,566 | 11/1976 | Goldberg et al. | 210/433 M |
| 4,014,711 | 3/1977 | Odawara et al. | 127/46 B |
| 4,032,454 | 6/1977 | Hoover et al. | 210/323 R |
| 4,061,724 | 12/1977 | Grose et al. | 423/335 |
| 4,116,889 | 9/1978 | Chlanda et al. | 521/27 |
| 4,220,535 | 9/1980 | Leonard | 55/158 X |
| 4,243,701 | 1/1981 | Riley et al. | 427/244 |
| 4,302,334 | 11/1981 | Jakabhazy et al. | 210/500 |
| 4,305,782 | 12/1981 | Ostreicher et al. | 162/181 C |
| 4,340,428 | 7/1982 | Boddeker et al. | 106/122 |
| 4,341,605 | 7/1982 | Solenberger et al. | 204/90 |
| 4,344,775 | 8/1982 | Klein | 210/504 X |
| 4,421,567 | 12/1983 | Kulprathipanja | 127/46.3 |

OTHER PUBLICATIONS

Spriggs, H. D. et al, "Liquid Permeation through Polymeric Membranes", in *Membrane Separation Processes* Patrick Meares, Editor, Elsevier Scientific Pub. Co., N.Y. 1976, pp. 39–44, 77–79.

*Kirk-Othmer Encyclopedia of Chemical Technology* (New York, John Wiley and Sons, 1979), Third Ed., 7, pp. 833, 840 and 841.

"The Diffusion Time Lag in Polymer Membranes containing Adsorptive Fillers" by D. R. Paul and D. R. Kemp—J. Polymer Sci.: Symposium No. 41, 79–93 (1973).

"Silicalite, A New Hydrophobic Crystalline Silica Molecular Sieve" by E. M. Flanigen, J. M. Bennett, R. W. Grose, J. P. Cohen, R. L. Patton, R. M. Kirchner and J. V. Smith—Nature, vol. 271, Feb. 9, 1978, pp. 512–516.

*Primary Examiner*—David Sadowski
*Attorney, Agent, or Firm*—Thomas K. McBride; John F. Spears, Jr.; Louis A. Morris

[57] ABSTRACT

A process for separating a monosaccharide from an aqueous solution comprising monosaccharides and a second component comprising a polysaccharide. The mixture is contacted with a mixed matrix membrane comprising a adsorbent or molecular sieve material dispersed in an organic polymer in which the monosaccharide has a greater steady state permeability than the polysaccharide. The monosaccharide passes through the membrane, and is recovered. Particular mixed matrix membranes found to be useful in separating mono from polysaccharides are silicalite, gamma-alumina, activated carbon or a calcium exchanged Y-zeolite dispersed in cellulose acetate or polyelectrolyte complex polymers.

10 Claims, 6 Drawing Sheets

Hours
Cay - Calcium Cation Exchanged Y-Zeolite
CA - Cellulose Acetate

SEPARATION OF A MONOSACCHARIDE WITH MIXED MATRIX MEMBRANES

BACKGROUND OF THE INVENTION

1. Field of the Invention

This invention relates to separation processes and in particular the use of a mixed matrix membrane to achieve such separation of a monosaccharide from a polysaccharide.

2. Background Information

In recent years reverse osmosis has attracted a great deal of interest for utilization in fields involving purification of liquids. This is of especial importance when utilizing this system in the purification of water and especially saline water. Likewise, the process is also used to remove impurities from liquids such as water or, in the field of dialysis, blood. When utilizing reverse osmosis in the purification of a saline water, a pressure in excess of the osmotic pressure of the saline water feed solution is applied to the solution which is prepared from purified water by the semipermeable membrane. Pure water thereby diffuses through the membrane while the sodium chloride molecules or other impurities which may be present in the water are retained by the membrane.

Various semipermeable membranes are now being used in commercial processes for performing separations by the reverse osmosis treatment of aqueous solutions either for the portion of relatively pure water or for concentration of a liquid solution being treated or both. Such semipermeable membranes which are being used commercially include the early Loeb-type membranes made of cellulose diacetate by processes such as described in U.S. Pat. Nos. 3,133,132 to Loeb et al. and 3,133,137 to Loeb et al. The Loeb-type membranes comprise the asymmetric type which are characterized by a very thin, dense surface layer or skin that is supported upon an integrally attached, much thicker supporting layer. Other types of semipermeable membranes which are also in use include membranes having been fabricated from polyamides, polyimides, polyphenyl esters, polysulfone, polybenzimidazole, polyarylene oxides, polyvinylmethyl ether and other polymeric organic materials.

It is taught in U.S. Pat. No. 4,243,701 to Riley et al. that certain membranes may also be utilized for the separation of various gases. The separation of a gas mixture utilizing a membrane is effected by passing a feed stream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

The use of adsorbents or molecular sieves in separating components from fluid mixtures is also long known. In the adsorption type separation process the adsorbent exhibits selectivity of one mixture component over another or, with a molecular sieve, one component is more retained than another. The adsorbent may be employed in the form of a dense compact fixed bed which is alternatively contacted with the feed mixture and desorbent materials. In the simplest case, the adsorbent is employed in the form of a single static bed in which case the process is only semi-continuous. In another embodiment, a set of two or more static beds may be employed in fixed bed contacting with appropriate valving so that the feed mixing is passed through one or more adsorbent beds, while the desorbent materials can be passed through one or more of the other beds in the set. The flow of feed mixture and desorbent materials may be either up or down through the adsorbent.

The most commercially successful embodiment of the adsorptive type separation process is the countercurrent moving-bed of simulated moving-bed countercurrent flow system. In that system the adsorption and desorption operations are continuously taking place which allows both continuous production of an extract and raffinate stream and the continual use of feed and desorbent streams. The operating principles and sequence of such a flow system are described in U.S. Pat. No. 2,985,589 to Broughton et al.

It is known in the separation art that certain crystalline aluminosilicates referred to as zeolites can be used in the separation of a component from an aqueous solution of a mixture of different components. For example, adsorbents comprising aluminosilicate are used in the method described in U.S. Pat. No. 4,014,711 to Odawara to separate fructose from a mixture of sugars in aqueous solution including fructose and glucose.

It is also known that crystalline aluminosilicates or zeolites are used in adsorption processing in the form of agglomerates having high physical strength and attrition resistance. Methods for forming the crystalline powders into such agglomerates include the addition of an inorganic binder, generally a clay comprising silicon dioxide and aluminum oxide to the high purity zeolite powder in wet mixture. The blended clay zeolite mixture is extruded into cylindrical type pellets or formed into beads which are subsequently calcined in order to convert the clay to an amorphous binder of considerable mechanical strength. As binders, clays of the kaolin type are generally used. It is also known that water permeable organic polymers such as cellulose acetate are superior binders.

A new composition of matter referred to as "silicalite", has recently been developed and patented (see U.S. Pat. No. 4,061,724 to Grose et al.). Silicalite is a hydrophobic crystalline silica molecular sieve. Due to its aluminum-free structure, silicalite does not show ion-exchange behavior, and is hydrophobic and organophilic. Silicalite thus comprises a molecular sieve, but not a zeolite. Silicalite is uniquely suitable for many separations processes for the presumed reason that its pores are of a size and shape that enable the silicalite to function as a molecular sieve, i.e., accept the extract molecules into its channels or internal structure, while rejecting the raffinate molecules. A detailed discussion of silicalite may be found in the article "Silicalite, A New Hydrophobic Crystalline Silica Molecular Sieve"; *Nature*, Vol. 271, 9 Feb. 1978, incorporated herein by reference.

There are numerous reference which disclose the incorporation of various materials with separation membranes. U.S. Pat. Nos. 3,457,170 to Havens; 3,878,104 to Guerrero; 3,993,566 to Goldberg et al.; 4,032,454 to Hoover et al.; and 4,341,605 to Solenberger et al. teach the use of structural supports or reinforcement fibers or fabrics to aid the membrane in resisting the high pressures used in the reverse osmosis process.

U.S. Pat. No. 3,556,305 to Shorr shows a "sandwich" type reverse osmosis membrane comprising a porous substrate covered by a barrier layer, in turn covered by a polymer or film bonded to the barrier layer by an adhesive polymeric layer. U.S. Pat. No. 3,862,030 to Goldberg shows a polymeric matrix having an inorganic filler such as silica dispersed throughout which imparts a network of micro-voids or pores of about 0.01 to about 100 microns, capable of filtering microscopic or ultrafine particles of sub-micron size. U.S. Pat. No. 4,116,889 to Chlanda et al. discloses a bipolar membrane comprising a layer of ion exchange resin and a layer of particles of an ion exchange resin in a matrix polymer, useful for electrodialytic water splitting. U.S. Pat. No. 4,302,334 to Jakabhazy et al. discloses a membrane "alloy" comprising a hydrophobic fluorocarbon polymer blended with polyvinyl alcohol polymer which imparts hydrophilic properties to the membrane. U.S. Pat. No. 4,340,428 to Böddeker et al. discloses a membrane comprising a swollen organophilic bentonite in a cellulose acetate polymer for use in water desalting.

Mixed matrix membranes such as molecular sieves incorporated with polymeric membranes are also broadly disclosed in the art. In the article "The Diffusion Time Lag in Polymer Membranes Containing Adsorptive Fillers" by D. R. Paul and D. R. Kemp, J. Polymer Sci.; Symposium No. 41, 79-93 (1973), the specific mixed membrane used was a Type 5A (Linde) zeolite incorporated with a silicone rubber matrix. The Paul et al. article illustrates that the zeolite "filler" causes changes in the time lag for reaching steady state permeation of the membrane by various gases due to the differences in adsorption of the gases by the zeolite. It is taught in this article that once the zeolite becomes saturated by the permeating gas a steady state selectivity (ratio of permeation rates) through the membrane is reached substantially the same as if the zeolite was not present. The Paul et al. article teaches making the mixed matrix membrane by dispersing the molecular sieves into the fluid silicone prepolymer prior to casting.

U.S. Pat. No. 2,924,630 to Fleck et al. broadly discloses the use of a zeolitic barrier material which may be mechanically pressed into or deposited in the pores of a fluid-permeable material to provide a means for separating molecules of different sizes.

U.S. Pat. No. 3,817,232 to Nakajima et al. discloses the use of either a zeolite or a nitrogen impermeable membrane for the separation of oxygen from nitrogen.

U.S. Pat. No. 4,305,782 to Ostreicher et al. discloses the use as a filter media of activated carbon or molecular sieves in a self-bonding matrix of cellulose fiber.

We have discovered a novel and highly advantageous method of using a particular mixed matrix membrane for the separation of a monosaccharide from a polysaccharide not disclosed by any of the known art either alone or in combination.

SUMMARY OF THE INVENTION

Our invention, in one embodiment, is a process for separating a monosaccharide from an aqueous solution comprising the monosaccharide and a second component comprising a polysaccharide by contacting at separation conditions the aqueous solution with a mixed matrix membrane comprising an adsorbent or molecular sieve material dispersed in an organic polymer in which membrane the monosaccharide has a greater steady state permeability than the polysaccharide, and recovering the monosaccharide which passes through the membrane.

Other embodiments of our invention encompass various details as to specific compositions, conditions and materials used, all of which are hereinafter disclosed in the following discussion of each of the facets of the present invention.

DESCRIPTION OF THE INVENTION

The present invention is partially based on the aforementioned information concerning membranes, particularly membranes comprising polymeric organic materials. The present invention also utilizes one or more of the well-known adsorbent or molecular sieve materials such as zeolites, crystalline silica or activated carbon. The present invention, however, in a manner not known to the art incorporates such material with the membrane to create a mixed matrix membrane and uses that creation in a unique process for separating a mono and poly-saccharide from each other which would otherwise be difficult or impossible to separate.

Those skilled in the art of membrane separation technology know that different components of a fluid system may pass through a properly selected membrane at different rates due to different diffusivity and solubility characteristics (hereinafter collectively referred to as "permeability") of each component in the membrane. This phenomenon may be expressed in terms of a separation factor as defined in the formula:

$$\alpha\, A/B = \frac{(C_A/C_B)P}{(C_A/C_B)R}$$

where
  $\alpha\, A/B$ = separation factor;
  $(C_A/C_B)P$ = concentration of component A ÷ concentration of component B in the permeate phase (emanating from the downstream face of the membrane);
  $(C_A/C_B)R$ = concentration of component A ÷ concentration of component B in the raffinate phase (at the upstream face of the membrane).

The higher the separation factor, the better the separation that will be achieved. An $\alpha\, A/B$ of over 3.0 is considered conducive to a separation.

The discovery has been previously made that when a properly selected adsorbent or molecular sieve material is incorporated with a particular membrane in a certain manner to obtain a mixed matrix membrane, a surprising and unexpected increase will occur with regard to the separation factor of that membrane for a given fluid mixture. Such discovery enabled viable processes in which fluid components might be separated from a mixture because of the marked differences in their respective permeabilities through the mixed matrix membrane, which marked differences do not occur in a adsorbent or molecular sieve material-free membrane. Proper selection of membrane material for a given system would enable long term steady state permeation through the mixed matrix membrane to be achieved. We have discovered a particular adsorbent or molecular sieve material membrane combination that enables separation of mono and polysaccharides.

The so-called "simple sugars" are classified as monosaccharides and are those which upon hydrolysis do not break down into smaller simpler sugars. One may further classify monosaccharides as aldoses or ketoses, depending upon whether they are hydroxy aldehydes or hydroxy ketones, and by the number of carbon atoms in the molecule. Most common and well known are probably the hexoses. Common ketohexoses are fructose (levulose) and sorbose; common aldohexoses are glucose (dextrose) mannose and galactose. The term "oligosaccharides", as commonly understood in the art and as used herein, means simple polysaccharides containing a known number of constituent monosaccharide units. An oligosaccharide that breaks up upon hydrolysis into two monosaccharide units is called a disaccharide, examples being sucrose, maltose, and lactose. Those giving three such units are trisaccharides, of which raffinose and melezitose are examples. Di-, tri-, and tetrasaccharides comprise practically all of the oligosaccharides. The term "polysaccharide" includes oligosaccharides but usually it refers to carbohydrate materials of much higher molecular weight, namely, those that are capable of breaking up upon hydrolysis into a large number of monosaccharide units. Typical polysaccharides are starch, glycogen, cellulose and pentosans. For the purpose of defining the present invention, however, the term "polysaccharides" shall simply mean any saccharide other than a monosaccharide.

The absorbent or molecular sieve material might be a crystalline aluminosilicate such as a zeolite, crystalline silica, an inorganic oxide, an ion exchange resin or activated carbon. A preferred zeolite is calcium cation exchanged Y-type zeolite. The crystalline silica is that having a silica/alumina mole ratio of at least 12. One such crystalline silica is known as silicalite which has a silica/alumina mole ratio of infinity, i.e., it contains no alumina. Silicalite is a hydrophobic crystalline silica molecular sieve. Silicalite is disclosed and claimed in U.S. Pat. Nos. 4,061,724 and 4,104,294 to Grose et al., incorporated herein by reference. A more detailed discussion of silicalite may be found in the article, "Silicalite, A New Hydrophobic Crystalline Silica Molecular Sieve"; Nature, Vol. 271, 9 Feb. 1978, incorporated herein by reference. Examples of other crystalline silicas suitable for use in the present invention are those having the trademark designation "ZSM" and silica/alumina mole ratios of at least 12. The ZSM adsorbents are as described in U.S. Pat. No. 4,309,281 to Dessau, incorporated herein by reference.

The inorganic oxide found to be most effective is finely divided gamma-alumina particles. Activated carbon, as appropriate for the present invention, is a common, commercially available material, such as sold by Calgon Corporation, or Union Carbide Corporation. The mixed matrix membrane of our invention is believed at present to most advantageously incorporate a membrane material comprising an organic polymer such as cellulose acetate or a polyelectrolyte complex. The latter material may consist of sodium polystyrene sulfonate and poly(vinylbenzyl trimethylammonium chloride).

Separation may be effected by the present invention over a wide range of separation conditions. Ambient temperature and a moderate pressure of from about 10 psig to about 500 psig on the upstream face of the mixed matrix membrane would be entirely adequate. This is in marked distinction to the reverse osmosis processes which require that osmotic pressures be exceeded, which in some instances would reach several thousand psig. The flux or rate of permeation through the membrane is directly proportional to the pressure differential across the membrane.

The preferred method of making the membrane for use in the present invention involves forming a slurry of particles having a particle size of from about 0.1 microns to about 5.0 microns, in which the membrane material is soluble, thoroughly mixing the slurry to obtain a highly uniform dispersion, adding the membrane material to the slurry while continuing to mix until a homogeneous solution is obtained and casting the solution to obtain the mixed matrix membrane. The volume ratio of particles to membrane material should range from about 1:2 to about 1:20. Adding the adsorbent particles to the solvent prior to introduction of the membrane material is very important from the standpoint of the quality of the mixed matrix membrane ultimately obtained, i.e., the freedom of the membrane from air pockets and perforations, In contradistinction, the Paul et al. article teaches at page 85 to disperse the molecular sieve particles into the prepolymer. We believe that the solvent serves to drive air out of the pores of the adsorbent so that when the membrane material is added there will be no air to form pockets and pinholes.

The constant mixing as mentioned in the above method is also very important. Mixing will, of course, facilitate a uniformity of the dispersion of the adsorbent particles in the membrane, and in minimizing the clumping together of the particles will further preclude the formation of pinholes. Mixing is best effected by ultrasonic means.

The casting of the solution as mentioned in the above method is preferably effected by (a) pouring the solution onto a flat surface; (b) slowly removing substantially all of the solvent from the solution so as to cause gelation of the solution and formation of a membrane; (c) submerging the membrane in a hot liquid bath to cause the annealing of the membrane; and if desired, (d) drying the membrane. Under certain circumstances the solvent is removed solely by evaporation, but, under other circumstances by evaporation of a portion of the solvent followed by submerging the partially formed membrane in a liquid bath in which the solvent is insoluble, e.g., cellulose acetate as the membrane material, acetone formamide as the solvent and ice water as the bath liquid. Annealing, on the other hand, might be carried out in a hot water bath at a temperature of from about 50° C. to about 100° C. It is believed that annealing causes the polymer chains comprising the membrane material to line up in a parallel manner rather than cross over each other which serves to further minimize the creation of undesirable voids.

The following examples are presented for illustrative purposes only and are not intended to limit the scope of our invention.

EXAMPLE I

A series of batches of mixed matrix membranes of about 30 microns in thickness were prepared in accordance with a preferred method of preparation by the following steps for each batch:

1. 15.0 grams of CaY, silicalite or activated carbon powder was stirred by ultrasonic means in a mixture of 59.5 gm of acetone and 25.5 gm of formamide at room temperature for about 3 hours;

2. 15.0 grams of cellulose acetate powder (acetyl content of 39.8%) was added to the CaY, silicalite or activated carbon powder acetone formamide suspension, the suspension was stirred until a homogeneous solution was obtained with a partial vacuum applied for a short time to ensure removal of all air bubbles;

3. The solution was poured on the top horizontal surface of a clean glass plate and a portion of the acetone allowed to slowly evaporate until a film formed on the upper surface of the solution;

4. The membrane was allowed to set for two minutes and then submerged in an ice water bath for two minutes; and 5. The membrane was removed from the ice water bath and submerged in a hot water bath at about 50° C. for one hour.

For comparison purposes, a quantity of membrane was prepared which consisted only of cellulose acetate without added CaY, silicalite or activated carbon powder.

EXAMPLE II

Pieces of the mixed matrix membrane from a batch prepared as described in Example I comprising calcium cation exchanged Y-zeolite dispersed in cellulose acetate was cut to an appropriate size and used in a test cell to determine the compaction resistance of the membrane. The plain cellulose acetate membrane was also tested in two separate runs. In the test cell for each run, an aqueous solution comprising 20 to 30 wt. % of dry solids of which 75.4 wt. % was monosaccharide (DP1), 3.6 wt. % disaccharide (DP2), 0.3 wt. % trisaccharide (DP3) and 20.7 wt. % tetra and higher saccharides (DP4+) was charged to one face of the membrane at a rate of 200 ml/min. The temperature of the solution in contact with the membrane was 60° C., and the pressure drop across the membrane was 6.8 atm.

The attached FIG. 1 is a plot of flux, which is the quantity of solution which passes through the membrane, vs. time for each run. The more constant the flux with time, the better the compaction resistance. It is clear from FIG. 1 that a calcium cation exchanged Y-zeolite in the membrane material not only imparts superior flux in a very short period of time, but also is capable of maintaining that high flux over an extended period. The mixed matrix membrane is certainly far superior with regard to flux considerations, than the plain membrane. Also given on FIG. 1 for each plot is the average wt. % on a dry basis of the monosaccharide in the permeate throughout the run.

EXAMPLE III

In this example additional tests were run to measure the ability of the membranes to separate the monosaccharides from the test solution, in terms of the percent rejection by the membrane of higher order saccharides, for varying rates of flux. These tests were run for both the mixed and plain membranes as in Example II, and with the same feed composition flow rates and operating conditions.

Figure 2:
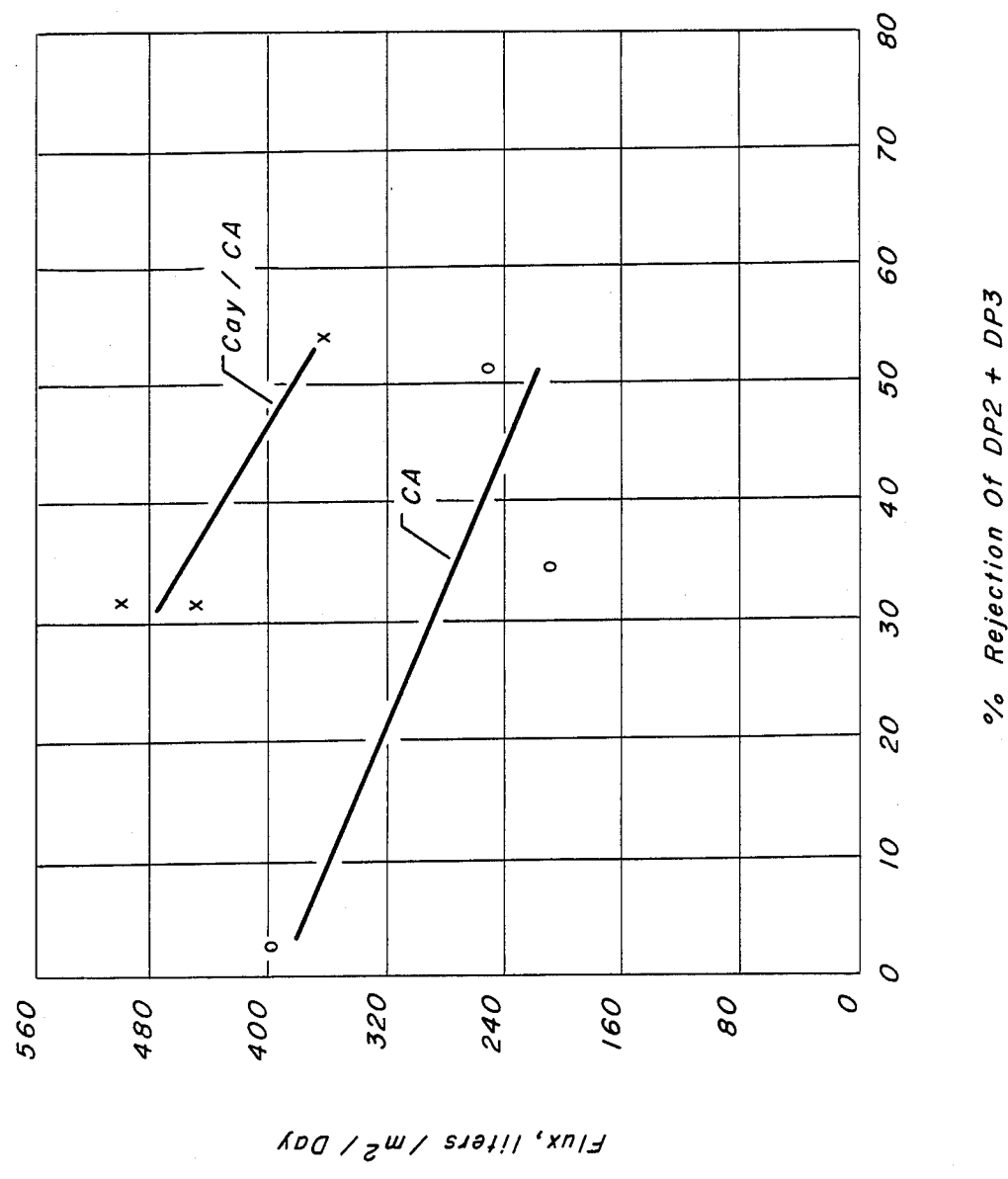

The results of the two tests are shown in FIG. 2. It is clear from this figure that at a given degree of separation, the mixed matrix membrane enables a far higher flux than the plain cellulose acetate membrane.

EXAMPLE IV

Figure 3:
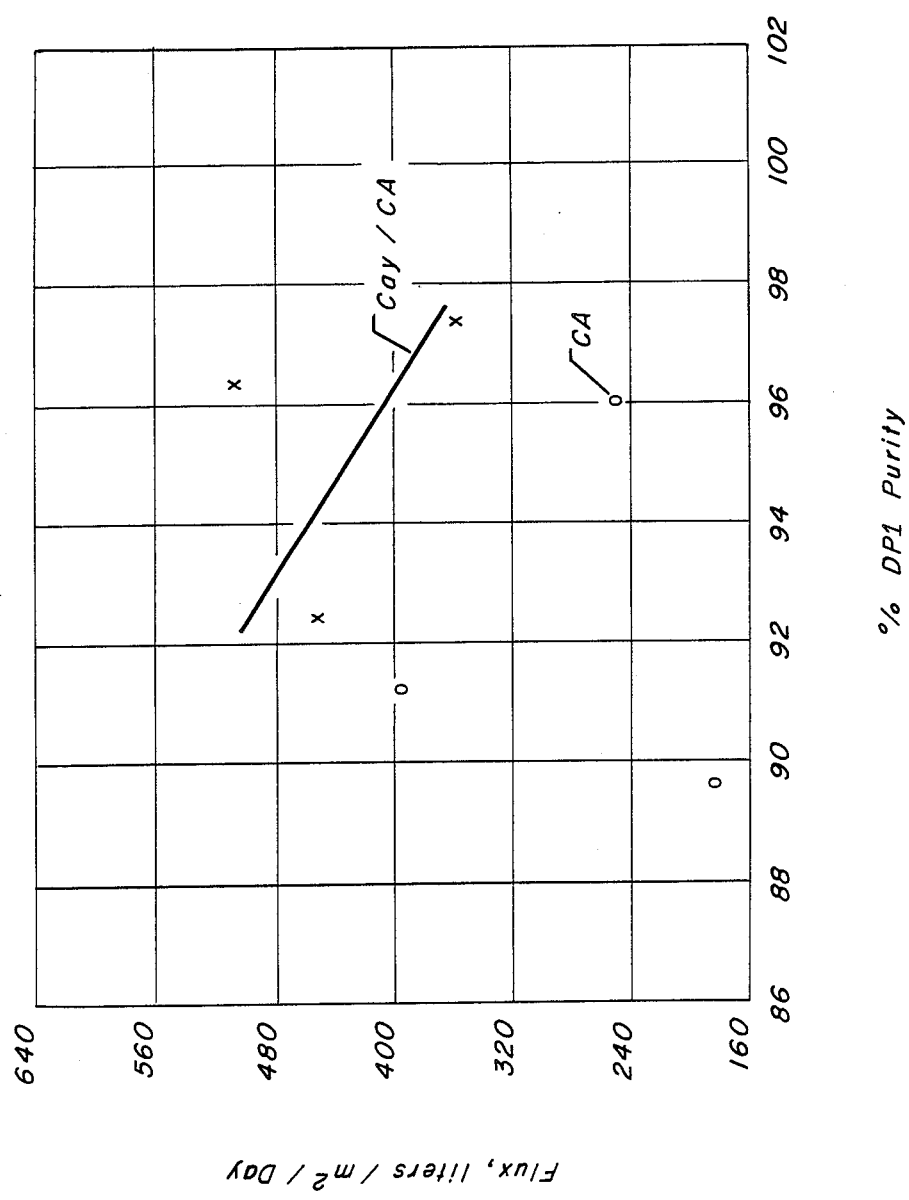

In this example it was determined that for a given monosaccharide product purity the mixed matrix membrane of the above examples enabled a much greater rate of flux than the plain membrane. The test conditions and parameters were the same as for Example III. The data obtained was plotted as shown in FIG. 3. No effort was made to construct a straight line relating to the plain membrane data because of how severely it was scattered.

EXAMPLE V

Figure 4:
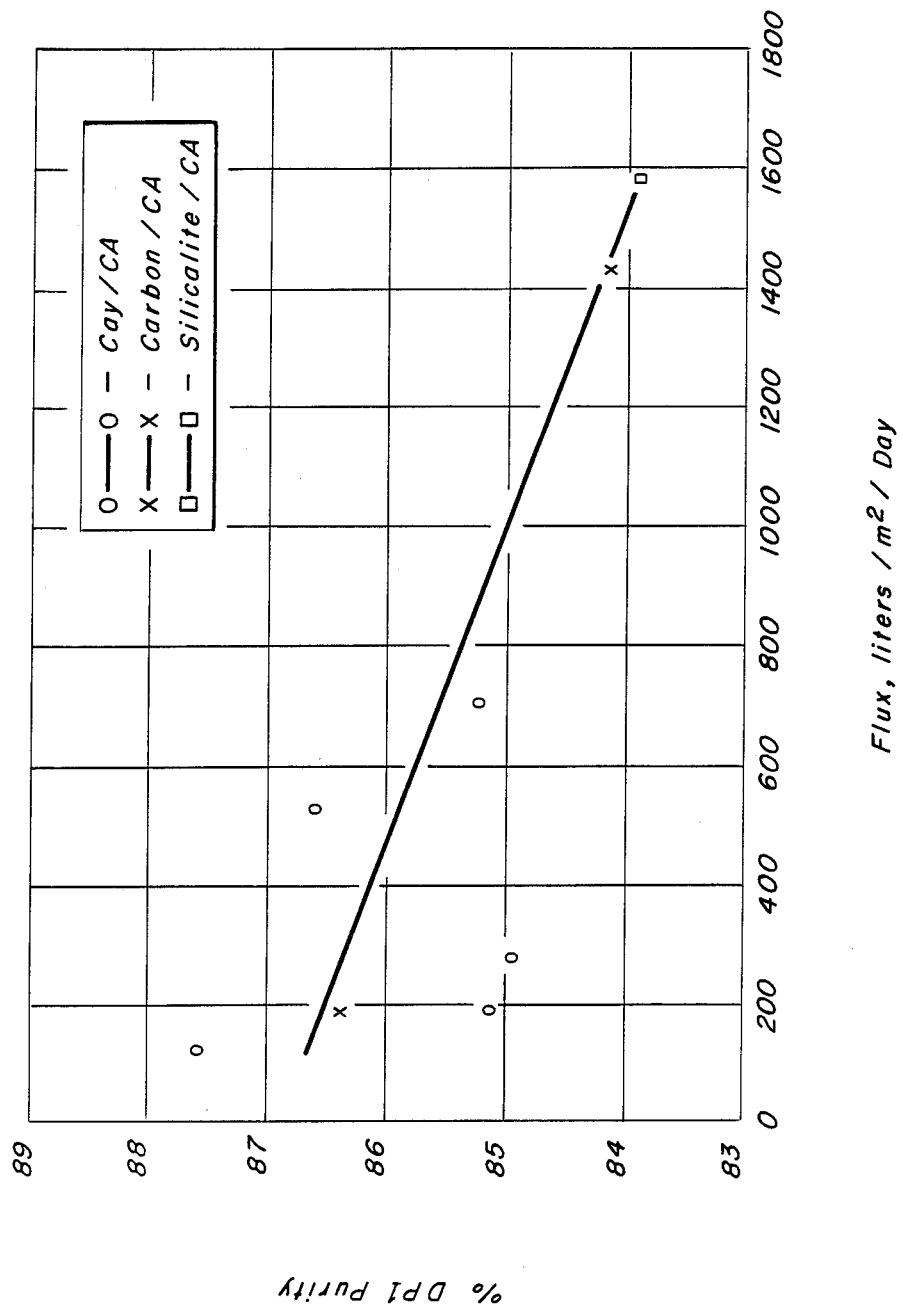

In this example product purity vs. flux data was obtained for three mixed matrix membranes, each comprising a different particulate material in cellulose acetate, i.e., calcium cation exchanged Y-zeolite, activated carbon and silicalite. The test conditions and parameters differed from those of Example IV in that the aqueous solution was charged to one face of the membrane at 540 ml/min. and the pressure across the membrane was 13.6 atm. FIG. 4 comprises a plot of the data obtained. Only one point was plotted for the silicalite containing membrane, two points for the carbon containing membrane and five points for the calcium-Y-zeolite containing membrane. All of the points taken together appear to reasonably define a straight line which would indicate that for a given rate of flux one could expect about the same DP1 purity regardless of the material used.

EXAMPLE VI

Figure 5:
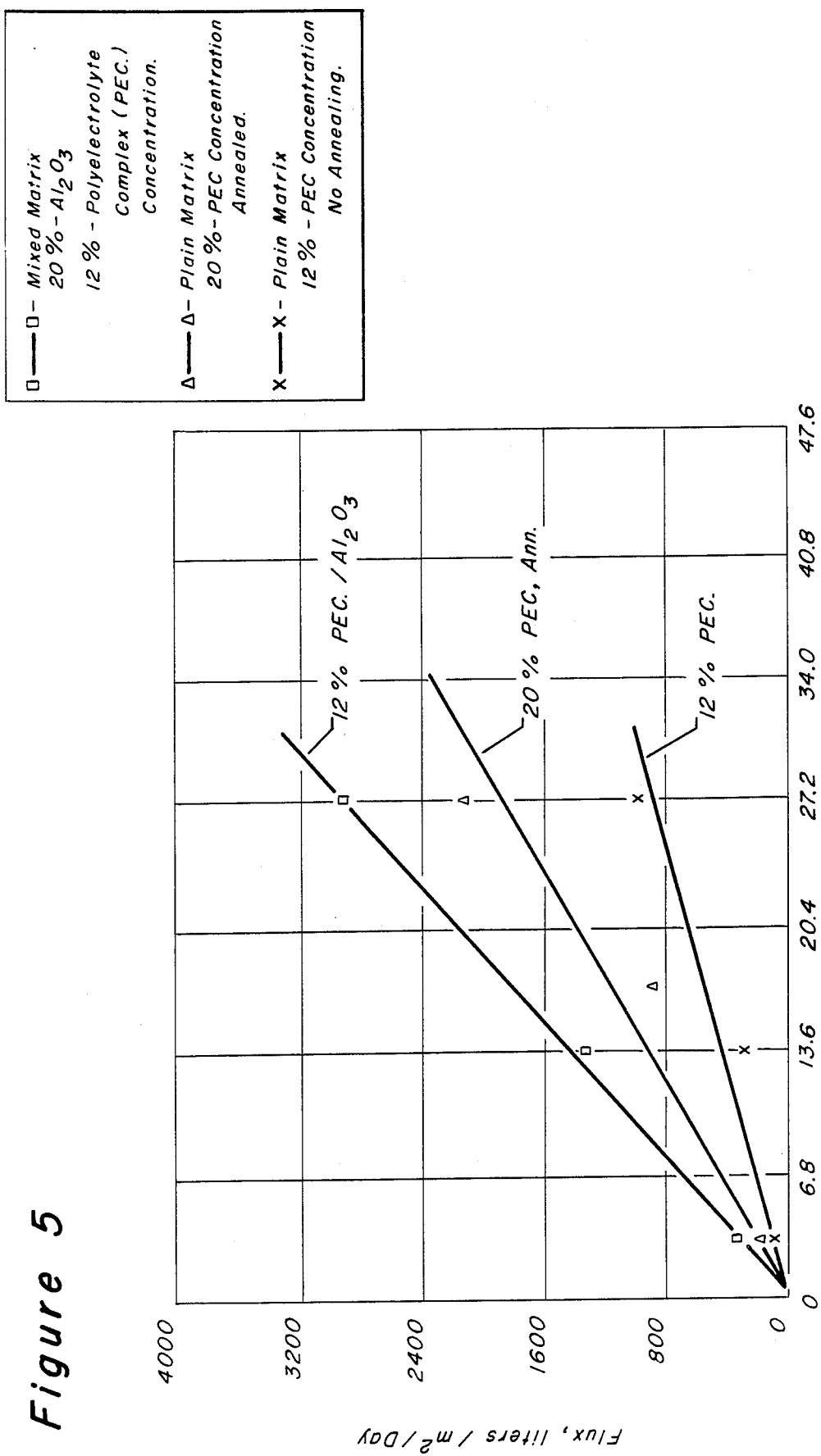

In this example tests were run using a mixed matrix membrane comprising 20 wt. % gamma-alumina dispersed in polyelectrolyte complex membrane (PEC) as well as two plain polyelectrolyte membranes (mixtures of poly(sodium styrene sulfonate) and poly(vinyl benzyl trimethylammonium chloride)). In the tests, the flux of water, at room temperature in a static cell was measured. The purpose of the tests was to determine the effect of pressure across the membrane on steady-state flux for each membrane. The data obtained is plotted as FIG. 5. It is clear from FIG. 5 that the mixed matrix membrane provides a greater rate of flux for any given pressure across the membrane than does either of the plain membranes. The mixed matrix and one of the plain membranes were formed using a 12% polymer concentration. A 20% polymer concentration was used in the other plain membrane which also underwent an annealing step.

EXAMPLE VII

The purpose of this example was to observe the decline with time of the water permeability through the membranes of Example VI. Test conditions and parameters were identical to those of Example VI, except that the pressure across the membranes in all cases was 3.4 atm.

Figure 6:
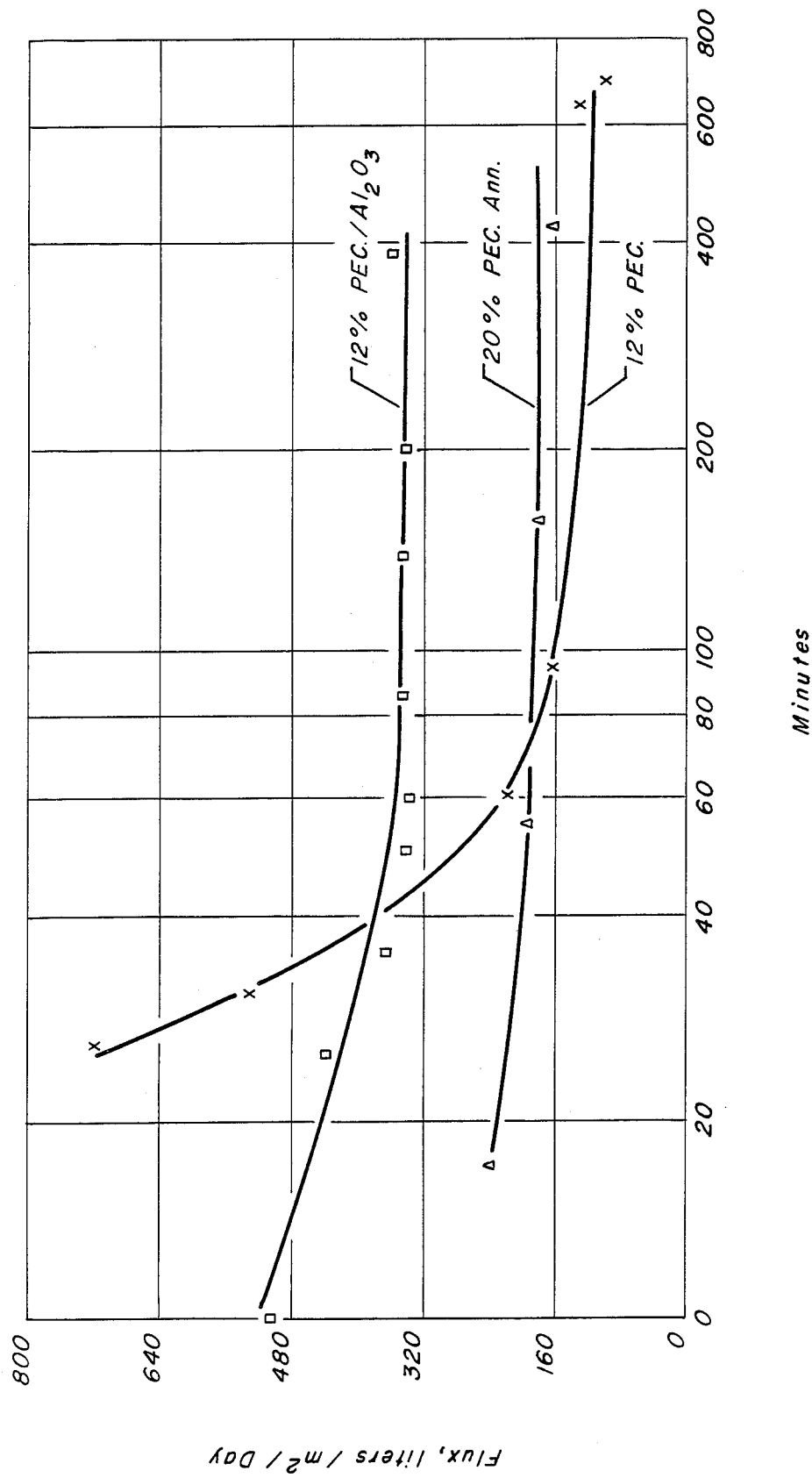

The results are shown in FIG. 6 where flux is plotted against time for each membrane. It is clear that the mixed matrix membrane is superior to the plain membranes with regard to flux rate after a short initial period.

We claim as our invention:

1. A process for separating a monosaccharide from an aqueous solution comprising said monosaccharide and a second component comprising a polysaccharide by contacting at separation conditions said aqueous solution with a mixed matrix membrane comprising a particulate material dispersed in an organic polymer in which membrane said monosaccharide has a greater steady state permeability than said polysaccharide, and recovering the monosaccharide which passes through said membrane, said particulate material selected from the group consisting of crystalline aluminosilicates, crystalline silica, an gamma-alumina, activated carbon and ion exchange resins.

2. The process of claim 1 wherein said material is a crystalline aluminosilicate.

3. The process of claim 2 wherein said material is calcium cation exchanged Y-type zeolite crystalline aluminosilicate.

4. The process of claim 1 wherein said material is crystalline silica.

5. The process of claim 1 wherein said material is activated carbon.

6. The process of claim 1 wherein said material is an ion exchange resin.

7. The process of claim 1 wherein said organic polymer comprises cellulose acetate.

8. The process of claim 1 wherein said organic polymer comprises a polyelectrolyte complex.

9. The process of claim 8 wherein said polyelectrolyte complex comprises poly(sodium styrene sulfonate) and poly(vinylbenzyl trimethylammonium chloride).

10. The process of claim 9 wherein said material is gamma-alumina particles.

* * * * *